C. W. GILL
COMBINED FASTENER AND SEAL.
APPLICATION FILED AUG. 10, 1908.
911,972.
Patented Feb. 9, 1909.
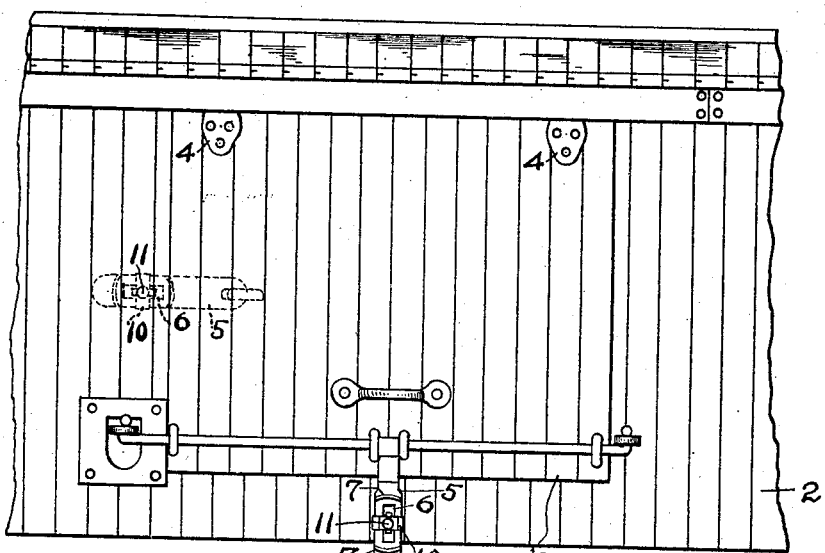
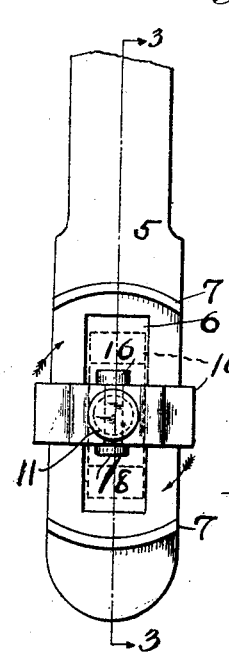
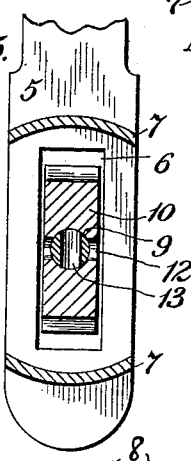
Fig.5. Fig.1. Fig.8. Fig.7.
Fig.2. Fig.3. Fig.4.
WITNESSES:
A. W. Heape
R. L. Wallace
INVENTOR.
Charles W. Gill.
BY Harry L. Wallace
ATTORNEY.

UNITED STATES PATENT OFFICE.

CHARLES W. GILL, OF SYRACUSE, NEW YORK.

COMBINED FASTENER AND SEAL.

No. 911,972.      Specification of Letters Patent.      Patented Feb. 9, 1909.

Application filed August 10, 1908. Serial No. 447,723.

*To all whom it may concern:*

Be it known that I, CHARLES W. GILL, citizen of the United States, residing at Syracuse, in the county of Onondaga and State of New York, have invented certain new and useful Improvements in a Combined Fastener and Seal, of which the following is a specification.

This invention relates to improvements in combined seal locks, designed for use in connection with doors of box cars and the like, and the invention relates particularly to novel means for securing freight car doors in closed position, and for sealing the same to prevent the opening of the doors and removing of the contents of the car without destroying the seal, or avoiding detection.

The object of the invention is to provide a simple, strong, effective and inexpensive fastener, particularly adapted for securing the doors of box cars and other receptacles for the transportation or storage of freight or goods.

A further object is to provide a novel and simple seal to coöperate with the fastening means for securing car doors and protecting them against entry without detection.

The invention consists principally of a hasp of peculiar construction, which is preferably attached to a car door.

The invention further consists of a stud-bolt to be rigidly set in the wall of the car in position to be engaged by the hasp. One end of the stud-bolt projecting from the face of the car body, and having mounted thereon a swiveled member or part adapted to pass through a slot in the hasp, and capable of being set in different positions for holding or releasing the hasp.

The invention further consists of a novel and simple seal, comprising a leaden bolt or part adapted to be inserted through corresponding perforations in the stud-bolt and swiveled part, after said parts have been set in operative position, the said leaden sealing part capable of being clenched to prevent its removal or displacement without destroying the seal. And the invention further consists of means for protecting the leaden bolt from injury or destruction except when removed by some authorized process.

The invention further consists of the construction and combinations of parts as set forth in the detail description which follows, illustrated by the accompanying drawings, and then pointed out in the appended claims.

In the drawings, Figure 1 is a side elevation of the central portion of a box car, showing my combined door fastener and seal operatively applied to a car door. Fig. 2 is an enlarged detail plan view of the device, showing the relative position and arrangement of the parts when set in locking and sealing position. Fig. 3 is a central longitudinal section substantially on the line 3—3 of Fig. 2, showing the construction and arrangement of the hasp, stud-bolt and sealing parts, as when holding the car door in closed position; also showing the integral shields and their relation to the stud-bolt and sealing parts. Fig. 4 is an enlarged side view of the hasp and stud-bolt, showing the swiveled thumb-button in position to register with the slot in the hasp. Fig. 5 is a view partly in plan and partly in section taken on the line 5—5 of Fig. 4, showing the thumb-button registering with the slot in the hasp; also showing the relative position of the perforations in the stud-bolt and thumb-button, as when the hasp is being applied to or detached from the stud-bolt. Fig. 6 is a view similar to Fig. 5, except that the thumb-button has been rotated to locking position, in which the perforations in both the button and stud-bolt register; also showing the lead sealing bolt and its protecting sleeve inserted through the button and stud-bolt, illustrating the first step in the sealing. Fig. 7 is an end view of the hasp and stud-bolt with a portion of one of the shields broken away to expose the thumb-button and the upset or clenched head of the seal, illustrating the final step in the sealing. Fig. 8 is a detail view of the leaden bolt and sleeve.

Similar numerals of reference are assigned to corresponding parts throughout the several views.

In the drawings, 2 represents the body of a car, and 3 the car door, which may be constructed and hung in any suitable manner, as by the hangers 4.

The means for fastening the car door, when closed, comprises a hasp 5, which is preferably pivoted to the door in suitable manner, and is employed for securing the door in closed position. The hasp 5 may be made of any suitable material, as iron or steel, but is preferably provided near its free end with an enlarged rectangular slot 6, and with oppositely facing guards 7 which are disposed near each end of the slot. The hasp 5 is preferably a modification of the hasp shown in my United States Patent No. 791,688, dated June 6, 1905, as illustrated by the full lines in Fig. 1, or it may comprise the form as illustrated by the dotted lines in Fig. 1.

8 represents a stud-bolt, which is driven into or otherwise rigidly applied to the side wall of the car, in position to register with and pass through slot 6 of the hasp, as illustrated in the drawings. The body of the stud-bolt 8 is preferably squared to prevent the same from rotating after it has been set in the body of the car. The inner end of the stud-bolt is threaded for a short distance to receive a button (not shown) for holding the stud-bolt rigidly in place. The outer end of the stud-bolt projects an inch or more from the body of the car, and this portion is formed cylindrical as at 9.

10 represents a swiveled member or part, resembling a thumb-button, which is bored to loosely fit the round portion 9 of the stud-bolt, and is held in operative position by the upsetting of the outer end of the stud-bolt, as indicated by the numeral 11. The button 10 is preferably made of metal in the form shown in Figs. 2 and 4, and is provided with a transverse perforation 12, which corresponds in size, and is intended to register at certain times, with a like perforation 13, which is formed through the round portion 9 of the stud-bolt 8. The inner face of the button 10 is cut away, as shown in Fig. 4, to form inwardly projecting stop lugs 14, which are provided for the purpose of overlapping the opposite edges of the hasp when the button 10 is shifted to locking position, as shown in Figs. 1, 2, 3, 6 and 7.

It will be seen by reference to the drawings, that in order to secure the car door in the closed position, the hasp 5 may only be passed over the swivel button 10, when the latter is in the position shown by dotted lines in Fig. 2, and by full lines in Figs. 4 and 5. To facilitate the interfitting of the hasp and stud-bolt in a ready manner, the slot 6 is made a trifle longer and broader than the button. After the hasp has been passed over the button the latter may be manipulated in either direction a quarter turn, to the position shown in Figs. 1, 2, 3, 6 and 7. The rotating of button 10 to the latter position, will prevent the accidental detaching of the hasp, and at the same time, bring the button into such position in relation to the stud-bolt, that the perforations 12 and 13 will register with each other, as shown in Figs. 3 and 6. When the button 10 is shifted to locking position, as last described, the lugs 14 will drop down over the edges of the hasp and serve to prevent the button from being jarred out of place, (see Fig. 7). In practice there will be enough looseness or spring allowed to the parts to permit the rotation of the button in either direction, and the passing of the lugs over the body and edges of the hasp.

When applying the stud-bolt 8 to the body of a car, it is essential that the same be so positioned that the perforation 13 in its outer end be disposed and thereafter maintained vertically, as shown in Figs. 2, 3, 5 and 6. On the other hand the perforation 12 should pass transversely through the button, so that when the button is in the position shown in Figs. 4 and 5 the said perforation is disposed horizontally in relation to the body of the car, and does not register with the hole 13 in the stud. When, however, the button is turned a quarter turn, as explained, and is disposed crosswise of slot 6 of the hasp, then the perforations 12 and 13 are brought into line or register, and a pin or like fastening device may be inserted through both the button and the stud-bolt, and thus prevent these parts from being accidentally detached.

For temporarily holding a car door in closed position, a common pin or bolt (not shown) may be inserted through the perforations in the button and stud-bolt, in the same manner as the old style hasp and staple fastenings are held.

Freight cars loaded with goods for transportation over a line of railroad, are rarely ever locked or otherwise fastened, except by means of hasps and bolts, and to these are usually applied some form of safety device, commonly known as "car seals". These car seals, as a rule, comprise one or more simple parts, usually a light strand of wire or strip of tin which is passed through the bolt, or through the hasp and staple, and then sealed in a manner to prevent access to the car without showing the breaking of, or injury to the seal.

It is an object of the present invention to provide a more effective and stronger sealing device, which is intended to coöperate with the hasp and stud-bolt herein shown and described, for fastening a car door when closed and also for preventing entrance to a car through the doors, and the taking or despoiling of the contents of the car. To this end I provide a simple part, preferably made of lead, but may consist of any other suitable metal or composition, in the form of a rivet or bolt, having a broad flat head 16 and a cylindrical stem 17. The stem of this leaden part is preferably made long enough to pass through button 10 and stud-bolt 8, as shown in Fig. 6, the small end of the lead pin protruding a short distance. Then to complete the sealing of the parts the projecting end of the stem 17 is crushed or upset with some suitable instrument, to form a head 18, as shown in Figs. 1, 2, 3, 7 and 9. The device employed for upsetting the rivet, may at the same time, impress in the newly formed head 18, the initials of a railroad, as illustrated in Fig. 7, or any other index character for use in checking or identifying the seal upon the arrival of a car at distant points on the line of shipment.

The leaden sealing rivet 17 being soft and incapable of resisting any great strain or wear, if used alone to hold the fastening parts, might readily be sheared at the intersection of the holes 12 and 13, by any one who applied sufficient force to turn the button 10 to the position to release the hasp. Then the heads 16 and 18 of the seal could be detached without injury, the car door unfastened, and the freight removed. In such a case, a car could be robbed of its entire contents, and the hasp and button put back in locking position, and the separated heads of the seal which showed no mutilation replaced in the holes 12, and the seal, unless tested manually, would readily be passed by inspectors and recorded as in proper condition. To safeguard against tampering with my seal and opening the car door, in the manner described, I provide a sleeve or tube 19, which is preferably made of steel, or other hard and tough metal, and this sleeve is fitted tightly around the stem 17 of the sealing bolt, and the two are then inserted as one part in the perforations 12 and 13 of the stud-bolt and button, as shown in Figs. 3, 6 and 10. In practice, the sleeve 19 is made substantially the length of the thickness of the button 10, as shown, and therefore passes through both the stud-bolt and the button, but does not prevent the proper forming of the second head 18, which is essential to complete the act of sealing. Under this construction and arrangement of the hasp, the swivel button and stud-bolt, and by reason of the construction and method of applying the sealing parts, it is practically impossible for any one to effect the shifting of the button 10, from the locking position shown in Figs. 1, 2, 3 and 6, to the released position shown in Figs. 4 and 5, unless the lead bolt and sleeve are first driven out of the holes 12 and 13, which would completely destroy one or the other of the heads of the seal, and hence, would show to a seal inspector that the sealing or fastening parts had been tampered with, or that the car had been entered and robbed. But, with the sleeve 19 closely fitting the lead bolt 17, and both passed through the perforations in the stud-bolt and button, as described, it is impossible for anyone to turn the button 10, and effect the shearing of these sealing parts. After the sealing has been done, as described, the leaden bolt 17 and also the sleeve 19 must be ejected or driven out free from the stud-bolt and button, before the latter may be rotated to release the hasp and open the door.

Any suitable instrument or ejecting device may be used by railroad employees for removing the leaden bolt and its sleeve. Any ejecting device employed, however, must be of such form as to be operable between the shields 7, and should punch out the rivet and sleeve in such manner as to leave the holes 12 and 13 clear and free for the insertion of the next seal. To prevent the removing or ejecting of the sealing parts by unauthorized processes, as by the use of a spike or common punch, I provide the shields 7, which may be formed integrally with the hasp, or may be constructed and applied in any other suitable manner. These shields are preferably disposed near each end of slot 6 of the hasp and are arranged both in form and in position in relation to the seal, so as to prevent ready and direct access to the heads 16 and 18 for the purpose of driving or ejecting the leaden rivet and sleeve.

Having thus described my invention, what I claim as new and desire to secure by Letters Patent, is—

1. A car-door seal, comprising a hasp, a stem to pass through an opening in the hasp and formed with a perforation, a button mounted on said stem, and formed with a perforation adapted to be brought into register with the perforation in the stem when the button is in position across the hasp, said perforations when in register being adapted to receive a pin for securing the button across the hasp to lock the hasp, substantially as described.

2. A car-door seal, comprising a hasp, a stem to pass through an opening in the hasp and formed with a perforation, a revoluble button mounted on said stem and formed with a perforation adapted to be brought into register with the perforation in the stem when the button is in position across the hasp, said perforations when in register being adapted to receive a pin for sealing the button across the hasp, and a shield positioned opposite and adjacent to the sealing pin to afford security against unauthorized removal of the seal, substantially as described.

3. A car-door seal, comprising a hasp, a stem to pass through an opening in the hasp and formed with a perforation, a revoluble button mounted on said stem and formed with a perforation adapted to be brought into register with the perforation in the stem when the button is in position across the hasp, a seal consisting of a thimble and a relatively soft metal pin one within the other passing through the registering perforations of the stem and button, and a shield positioned opposite and adjacent to the seal to afford security against unauthorized removal of the seal, substantially as described.

4. A car-door seal comprising a hasp, a stem to pass through an opening in the hasp and formed with a perforation, a button mounted on said stem and formed with a perforation adapted to be brought into register with the perforation in the stem and having lugs to fit on opposite sides of the hasp when the button is in position across the hasp, the perforations in the stem and button when in register being adapted to receive a sealing pin, substantially as described.

In testimony whereof I affix my signature in presence of two witnesses.

CHARLES W. GILL.

Witnesses:
   WM. C. ANDERSON,
   HARRY DE WALLACE.